(12) United States Patent
Hendrix

(10) Patent No.: US 6,229,645 B1
(45) Date of Patent: May 8, 2001

(54) POLARIZATION SELECTING OPTICAL ELEMENT USING A PORRO PRISM INCORPORATING A THIN FILM POLARIZER IN A SINGLE ELEMENT

(75) Inventor: James Lee Hendrix, Livermore, CA (US)

(73) Assignee: The United States of America as represented by the United States Department of Energy, Washington, DC (US)

(*) Notice: Subject to any disclaimer, the term of this patent is extended or adjusted under 35 U.S.C. 154(b) by 0 days.

(21) Appl. No.: 09/493,194

(22) Filed: Jan. 28, 2000

(51) Int. Cl.$^7$ .................................................. G02B 27/28
(52) U.S. Cl. .......................... 359/483; 359/487; 359/496; 359/583; 359/834; 359/835
(58) Field of Search ................................. 359/483, 487, 359/488, 496, 583, 833, 834, 835

(56) References Cited

U.S. PATENT DOCUMENTS

| | | | |
|---|---|---|---|
| 4,923,758 | 5/1990 | Marks et al. ........................ | 428/437 |
| 5,071,906 | 12/1991 | Tanaka et al. ....................... | 524/557 |
| 5,404,820 | 4/1995 | Hendrix ............................... | 102/201 |
| 5,483,342 | 1/1996 | Rockwell ............................. | 356/351 |
| 5,559,634 | 9/1996 | Weber ................................. | 359/638 |
| 5,716,122 | 2/1998 | Esaki et al. ......................... | 353/33 |
| 5,717,472 | 2/1998 | Lee ..................................... | 349/9 |
| 5,796,770 | 8/1998 | Gregor et al ....................... | 372/75 |
| 5,847,871 | * 12/1998 | Sumida et al. ...................... | 359/487 |

* cited by examiner

Primary Examiner—Cassandra Spyrou
Assistant Examiner—Craig Curtis
(74) Attorney, Agent, or Firm—Armand McMillan; Dickson G. Kehl; Paul A. Gottlieb

(57) ABSTRACT

A Porro prism and a light polarizer are combined in a single optical element termed a Hendrix Prism. The design provides retro-reflection of incoming light of a predetermined polarization in a direction anti-parallel to the direction of light incidence, while reflecting undesired light, i.e., that having a polarization orthogonal to the predetermined polarization, from the surface of the light polarizer. The undesired light is reflected in a direction that does not interfere with the intended operation of the device in which the Hendrix Prism is installed yet provides feedback to the system in which it is used.

18 Claims, 1 Drawing Sheet y-z plane x-z plane

POLARIZATION SELECTING OPTICAL ELEMENT USING A PORRO PRISM INCORPORATING A THIN FILM POLARIZER IN A SINGLE ELEMENT

GOVERNMENT RIGHTS

The United States Government has rights in this invention pursuant to Contract No. DEAC04-76DP00613, between the U.S. Department of Energy and AlliedSignal, Inc.

FIELD OF INVENTION

The present invention relates to physically combining a Porro (or roof) prism with a thin-film polarizer in a single optical element, one purpose being to simplify alignment of laser-based systems.

BACKGROUND OF THE INVENTION

The roof or Porro prism derives its name from the similarity of its configuration to that of a traditional A-roof house, albeit without eaves. Two faces of the Porro prism are orthogonal and oriented with respect to the rest of the prism so that they form an A-shaped roof over the remaining faces. The remaining faces form a rectangular box(without eaves but having a triangular portion meeting the apex of the roof on two of the four sides) attached to the two faces forming the A-roof. The face directly opposing the faces forming the roof is the input face of the Porro prism.

The Porro prism has the characteristic of retro-reflecting light in one axis. That is, light incident on the Porro prism will be directed back on itself, even as the prism is rotated by several degrees about a line running parallel to the roof crest or apex.

One application of the Porro prism is as an optical element in a laser resonator. A standard polarization output coupler (POC) has been built using at least two separate devices: the conventional Porro prism and a separate thin-film polarizer, or a pair of Porro prisms oriented in an opposing uncrossed geometry. A polarization output-coupling scheme for a laser resonator must either depolarize the circulating laser pulse in the cavity by rotating one of the roof crests of the two Porro prisms from a 90° crossed configuration or use a separate polarizing-depolarizing device, such as a waveplate.

DESCRIPTION OF THE RELATED ART

Various devices are used to change incoming light polarization. In a laser resonator or like device that uses a polarization output coupling arrangement of prisms and polarizers, there is a need to separately align multiple prisms or align a separate polarizer with a prism during assembly and, for systems in extreme environments such as on helicopters, periodically after deployment to maintain performance. Using existing systems, there is a need for continuing physical alignment of the polarizer and its associated hardware. This continuous alignment requirement creates complexities that increase the cost of fabrication and assembly as well as operation.

It is known in the art to use multiple devices to change incoming light polarization. For example, U.S. Pat. No. 5,483,342, "Polarization Rotator with Frequency Shifting Phase Conjugate Mirror and Simplified Interferometric Output Coupler," issued to David A. Rockwell, on Jan. 9, 1996, describes an interferometer that employs "only" two adjustable elements: a specially shaped prism and a beam deflector that is preferably a Porro prism.

It is also known in the art to achieve polarization changes via coating with optical thin films. U.S. Pat. No. 5,559,634, "Retroreflecting Polarizer," issued to Michael F. Weber on Sep. 24, 1996, describes a retroreflecting polarizer, having optical thin films coated on structural material of a linear array of multiple isosceles prisms, that divides an incident beam of light, transmitting one polarized component and reflecting the other.

The use of "cemented," or otherwise joined, polarizing beam splitter "rectangular" prisms is known in the art. U.S. Pat. No. 5,716,122, "Optical Apparatus Using Polarizing Beam Splitter," issued to Sampei Esaki et al, on Feb. 10, 1998, depicts an optical apparatus for outputting polarized light in generally parallel beams. The apparatus uses a pair, or multiple pairs, of prisms that are cemented together. Each pair of cemented prisms has cross-sections that are right-angled triangles with a vertex angle of less than 45°, or less than 30°. Each of the cemented faces has a "thin-film group" polarizer applied.

It is still accepted in the art to use a prism with at least one other element to effect a polarization change. U.S. Pat. No. 5,717,472, "Polarizing Prism for Panel Type Liquid Crystal Display Front Projector and Optical System Using the Polarized Prism," issued to Jong Jin Lee on Feb. 10, 1998 provides for a beam separating prism, a triangular prism, and either a twisted nematic (TN) liquid crystal or a _or _wavelength plate. Lee's apparatus provides more efficient light transmittal as well as polarization selection.

Using physically separated multiple prisms for achieving polarizing-output coupling (POC) is also known in the art. U.S. Pat. No. 796,770, "Compact Diode Pumped Solid State Laser," issued to Eduard Gregor et al on Aug. 18, 1998, describes a POC resonator employing reflections from two opposing uncrossed roof prism mirrors to produce uniform near field and far field beams with near diffraction limited quality.

Means for coating prisms with thin-film polarizers are well known. An improved thin film and method of producing it is described in U.S. Pat. No. 5,071,906, "Polarizing Film and Process for the Production of the Same," issued to Chikafumi Tanaka et al on Dec. 10, 1991. A thin-film polarizer having superior heat resistance and excellent optical properties is made using iodine and a dichroic dye.

Optical polarizer thin films that are flexible and stretchable are well known. See, for example, U.S. Pat. No. 4,923,758, "Polarizing Prescription Lenses and Method of Making," issued to Mortimer Marks et al on May 8, 1990.

SUMMARY OF THE INVENTION

Accordingly, it is an aspect of the present invention to provide a polarization selecting optical element constructed from a Porro prism that incorporates a flexable, thin-film polarizer as an integral face of the Porro prism.

It is another aspect of the present invention to eliminate an inherent need for a first optical alignment step as well as a continuous alignment requirement during system operation It is a further aspect of the present invention to produce a device smaller in physical volume via elimination of the requirement for additional mounts as well as at least two physically separated optical elements.

It is another aspect of the present invention to reduce the complexity of optical systems, in particular, laser systems. This yields a device able to be manufactured and assembled by less skilled employees, thus reducing costs in several areas.

Finally, it is an aspect of the invention to reduce assembly time by removing alignment steps. These aspects have been attained by providing a device combining the best features of two separate elements, a Porro prism and a thin-film polarizer, in a single device, designated the "Hendrix Prism." Since the Hendrix Prism is "self-contained" in a single element, the need for alignment of separate components is eliminated.

BRIEF DESCRIPTION OF THE DRAWING(S)

Figure 1:
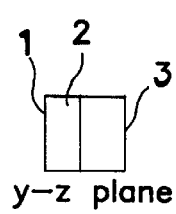
FIG. 1 is a y, z axis edge view of a basic Porro prism.
Figure 3:
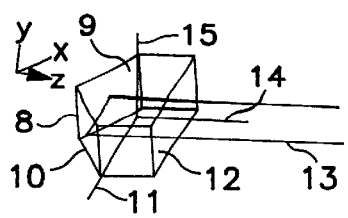
Figure 2:
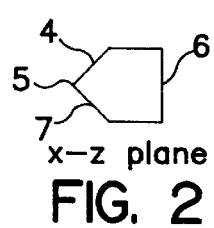
FIG. 2 is the x, z axis top view of a basicPorro prism.

FIG. 3 describes the operation of the basic Porro prism.

Figure 4:
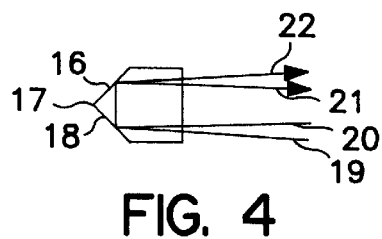

FIG. 4 shows the resulting angular misalignment of the output of a basic Porro prism.

Figure 5:
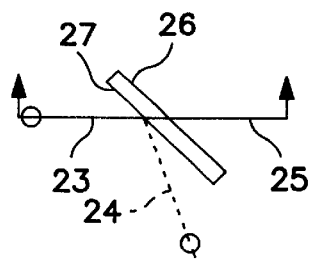

FIG. 5 is an example of a conventional thin-film polarizer.

Figure 6:
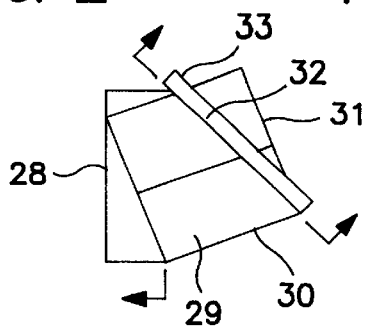

FIG. 6 is an illustration of the Porro prism and thin-film polarizer when brought together into a single component.

Figure 7:
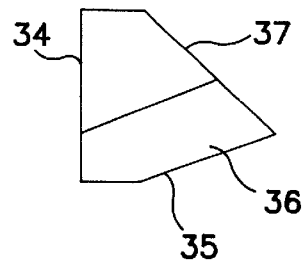

FIG. 7 represents the "Hendrix Prism".

Figure 8:
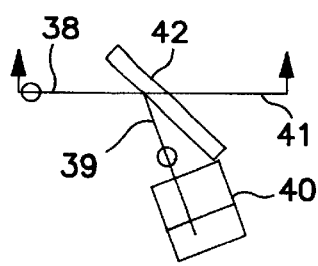

FIG. 8 exemplifies a known two-element polarization output coupler for a laser resonator.

Figure 9:
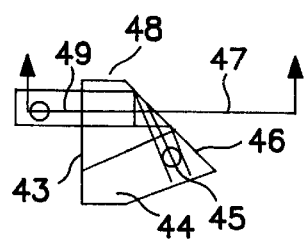

FIG. 9 depicts a "Hendrix Prism" used as a polarization output coupler for a laser resonator.

Figure 10:
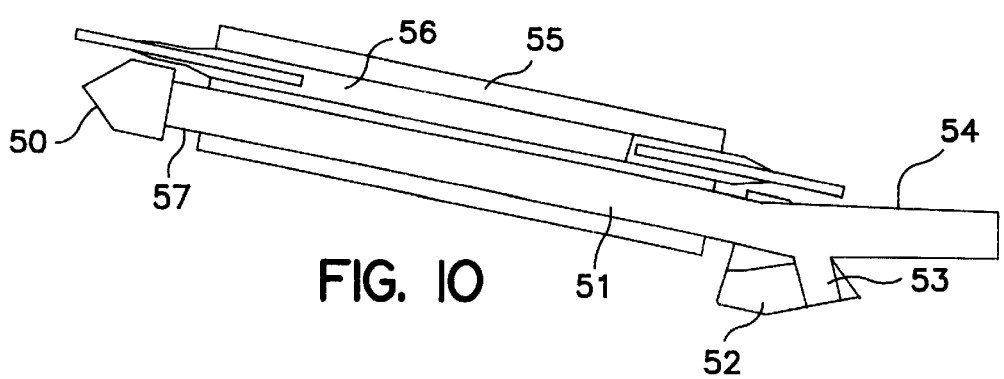

FIG. 10 portrays one embodiment of a "Hendrix Prismd" as used in a laser resonator.

DETAILED DESCRIPTION

FIGS. 1, 2, 3, and 4 describe a conventional Porro prism. Referring to FIG. 3, rotating the Porro prism about an axis perpendicular to the apex 8, i.e., about the "Y-axis," will deflect the incident beam like a simple mirror. By "crossing," or orienting two of these Porro prisms with their apexes perpendicular to each other, a resonator with alignment stability of a degree or more of angle results.

In a Porro prism, light enters through face 12 in FIG. 3 then strikes faces 9 and 10 each of said face pairs 9, 10 forming orthogonal planes. Conventional optical quality glass material provides total internal reflection when those pairs of surfaces are positioned so and thus light incident to face 12 in FIG. 3 emerges from the Porro prism parallel to and in the direction opposite, i.e., "anti-parallel" to which it arrived. FIG. 3 shows a ray of light 13 passing through face 12, striking face 9 then face 10 and re-emerging through face 12 "anti-parallel" to incident light ray 13. FIG. 4 shows the angular "insensitivity " of this retro-reflection effect when rotated about an axis parallel to "roof" crest 17. The axis itself is shown as 5 "coming out of the paper" in FIG. 2. Rotation about x-axis in FIG. 3 results in a typical 2X angular misalignment of the reflected beam (as happens with a conventional mirror).

FIG. 5 depicts a conventional thin-film polarizer. A thin-film polarizer makes use of the principle involved in defining Brewster's Angle. (Brewster's Law states that the tangent of the polarizing angle for a substance is equal to the index of refraction. The polarizing angle is that angle of incidence for which the reflected polarized ray is at right angles to the refracted ray. If n is the index of refraction, and $\pi$ the polarizing angle, then n=tan $\pi$. The Brewster Angle, $\pi_B$, is defined as tan $\pi_B = n_b/n_a$, where $n_b$ is the index of refraction of the media into which the light enters and $n_a$ is is the index of refraction of the media from which the light enters.) Referring to FIG. 5, this geometry provides minimum reflectivity to light polarized P when incident as light ray 23 and allows that light to continue nominally as light ray 25. However, light polarized S, will be reflected in the direction indicated as light ray 24. By adding a stack of dielectric thin-film coating layers 27 to the "glass" substrate 26 this effect may be made more efficient for the rejection of the S polarization. The coating layers 27 may be deposited using standard industry methods, e.g., vapor deposition, electron beam deposition, ion assisted deposition, or sputtering of alternating high and low index films such as zirconium dioxide ($ZrO_2$) or hafnium diode ($HfO_2$) and silicon dioxide ($SiO_2$), or equivalents. In order to afford certain packaging advantages, a design engineer may want to select a less efficient angle than Brewster's Angle, e.g., 45°, trading some optical efficiency for reduced package size.

FIG. 8 depicts the operation of a known polarization-output coupler for a laser resonator. The device uses, among other elements, a Porro prism 40 and a separate thin-film polarizer 42. The ray of light 38 can be resolved into two polarization components S and P, one perpendicular to the other. The thin-film polarizer 42 passes the P-polarized component as light ray 41 for its ultimate use as a polarization output coupler and reflects the S-polarized component as light ray 39. The light ray 41 represents the desired output beam of the laser resonator. Light ray 39, incident upon faces 9 and 10 of FIG. 3 of the Porro prism, is retro-reflected back along it self, again reflected by the thin-film polarizer 42 and back along the same path as light ray 38 (of course, in the opposite direction to light ray 38), thus providing feedback for the laser source.

FIG. 7 shows how the result obtained with the configuration of FIG. 5 is accomplished within the single element of the present invention. FIG. 9 depicts the operation of the combination of the Porro prism and the thin film polarizer described above. The prism is cut along the A—A section lines, shown as plane 32 in FIG. 6, and the resulting face, shown as face 37 in FIG. 7, is coated via vapor deposition or sputtering, creating a thin film polarizer. In FIG. 6, glass is added at 28 to create input face 34 shown in FIG. 7. The resulting "Hendrix Prism," shown in FIG. 7, has input face 34, face 37 with a thin-film polarization coating and an apexor "roof" crest 35 formed by the plane 36 and a companion plane (not shown) perpendicular to it along apex 35.

The present invention, the "Hendrix Prism," is a combined prism and polarizer FIG. 7. It is unique in that the thin-film polarizer is attached directly to one surface of the Porro prism, that specially provided surface being ground to Brewster's Angel with respect to impinging light. It is made from glass or glass-like material, forming an optical element that permits:

a) retro-reflection of incoming light in a direction opposite to but parallel with, i.e., "anti-parallel" to, the direction of incoming light incidence for a specific polarization. Along one axis, a Porro prism may normally perform this function.

b) light of a predetermined polarization to pass through a first part of the optical element. (This function is conventionally performed by a physically separate thin-film polarizer element.)

c) operation as a permanently-aligned single optical element having two functions: the first polarization selection, and the second retro-reflection in an anti-parallel direction of only that portion of impinging light having a predetermined polarization.

The polarizer thin-film may be comprised partially or wholly of any combination of a synthetic plastic monomeric material, a crosslinked nitrocellulose material, or a melamine formaldehyde condensation polymer material. Specifically, the thin-film may be polyvinyl butaryl.

A preferred embodiment of an application to a laser resonator is shown in FIG. 10. The resonator is made from a Porro prism 50 and a "Hendrix Prism" 52. A flashlamp 56 provides "pumping energy" to the laser rod 51 and pump cavity 55 concentrates light from the flashlamp 56 in the laser rod 51. A coherent light beam forms as depicted at 57, 53, and 54. Segment 54 represents the P-polarized light energy while segment 53 represents the S-polarized light energy. The degree of output coupling may be selected by changing either the relative angle of the apex on the Porro prism around the axis that runs through the laser rod 51 or by changing the properties of the thin-film coating on the "HendrixPrism" 52 itself.

A specific application would be the laser resonator to be used in the Laser Initiated Ordnance Controller (LIOC) as shown in FIG. 10, a crossed Porro prism polarization output coupled design. This resonator provides a means to control the effects of environmentally induced misalignments, such as shock vibration and temperature fluctuations, which would otherwise compromise performance.

An additional application using a polarized, or polarizing/birefringent, laser rod material, is to rotate the rod to change the output coupling for a perfectly crossed POC resonator. In this example, the present invention lends itself to increasing the reliability and "ruggedness" of installed laser components in the military's recently patented safe and arm (S&A) component of the laser initiated ordnance controller (LIOC). See U.S. Pat. 5,404,820, "No Moving Parts Safe and Arm Apparatus and Method with Monitoring and Built-in-Test for Optical Firing of Explosive Systems," issued to James L. Hendrixon Apr. 11, 1995.

The novel features of the present invention will be apparent to one of ordinary skill in the art upon examination of the detailed description and by practice of said invention. The detailed description of the invention, together with examples, while providing certain embodiments of said invention, are illustrative only. Various modifications within the spirit and scope of said invention will become apparent to one of ordinary skill in the art from the detailed description and accompanying claims.

I claim:

1. A single-element polarization-selecting optical device, comprising:
   a) a Porro prism having a plurality of faces to include a face in the shape of a rectangle at an input end, four side faces, each of said four side faces orthogonal to any one of said four side faces that touches it, two faces orthogonal to each other at an apex and immediately adjacent said four faces such that said two faces orthogonal to each other and disposed opposite said input end form an A-shaped roof when viewed with respect to said four faces and said input face, and a face cut at an angle less than 90° with respect to one side of said input end and disposed between said input end and said roof faces and immediately adjacent each of said four side faces; and
   b) a light polarizer, comprising a first thin film disposed on said face cut at an angle less than 90°, said first thin film comprising at least one layer.

2. The optical device of claim 1 wherein said Porro prism comprises an optically transparent material.

3. The optical device of claim 1 wherein said face cut at an angle less than 90° with respect to one side of said input face is cut at Brewster's angle.

4. The optical device of claim 1 wherein said face cut at an angle less than 90° with respect to one side of said input face is cut at about a 45° angle.

5. The optical device of claim 1 wherein said thin film comprises a flexible material.

6. The optical device of claim 1 wherein said polarizer comprises a plurality of thin films deposited on said face cut at an angle less than 90° with respect to one side of said input face, each of said plurality of thin films comprising at least one layer.

7. The optical device of claim 1 wherein said at least one layer comprises a dielectric material of a uniform thickness of about 0.1 to 40 microns.

8. The optical device of claim 1 wherein said thin film consists of at least two layers.

9. The optical device of claim 2 wherein said optically transparent material comprises an optical quality glass.

10. The optical device of claim 5 wherein said thin film is at least one material selected from the group comprising polyvinyl butaryl, an oxide of a metal, and a dielectric material.

11. The optical device of claim 6 wherein said each of said plurality of thin films comprises a flexible material.

12. The optical device of claim 7 wherein said dielectric material is selected from the group consisting of zirconium dioxide, hafnium dioxide, an oxide of a Group II metal, an oxide of a Group III metal, and an oxide of another Group IV metal.

13. The optical device of claim 7 wherein said dielectric material comprises a thin film on said face cut at an angle of less than 90°.

14. The optical device of claim 8 wherein said at least two layers comprise material having a high refractive index on at least one of said at least two layers inter stratified with material having a low refractive index on at least one of said at least two layers.

15. The optical device of claim 11 wherein said flexible material is at least one material selected from the group comprising polyvinyl butaryl, an oxide of a metal, and a dielectric material.

16. The optical device of claim 11 wherein said at least one layer of said flexible material comprises at least one oxide of a metal.

17. The optical device of claim 11 wherein said at least one layer of flexible material comprises at least one material selected from the group comprising: a synthetic plastic monomeric material, a crosslinked nitrocellulose material, and a melamine formaldehyde condensation polymer material.

18. The optical device of claim 17 wherein said at least one oxide of a metal comprises aluminum oxide.

* * * * *